(12) United States Patent
Funkhouser et al.

(10) Patent No.: US 6,986,391 B2
(45) Date of Patent: Jan. 17, 2006

(54) METHODS OF FRACTURING SUBTERRANEAN ZONES PENETRATED BY WELL BORES AND FRACTURING FLUIDS THEREFOR

(75) Inventors: Gary P. Funkhouser, Duncan, OK (US); Lewis R. Norman, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 180 days.

(21) Appl. No.: 10/304,430

(22) Filed: Nov. 26, 2002

(65) Prior Publication Data

US 2004/0211568 A1 Oct. 28, 2004

(51) Int. Cl.
*E21B 43/267* (2006.01)
*E21B 43/26* (2006.01)

(52) U.S. Cl. .......... 166/300; 166/308.5; 507/224; 507/225; 507/226; 507/227; 507/267; 507/271; 507/277; 507/903; 507/922

(58) Field of Classification Search .......... 166/278, 166/280.1, 300, 308.5; 507/119, 120, 121, 507/224, 225, 226, 267, 271, 277, 903, 922
See application file for complete search history.

(56) References Cited

U.S. PATENT DOCUMENTS 4,515,216 A * 5/1985 Childs et al. ............ 166/293
4,524,828 A * 6/1985 Sabins et al. ............ 166/293
4,582,139 A * 4/1986 Childs et al. ............ 166/293
5,407,909 A * 4/1995 Goodhue et al. ......... 507/118
5,759,964 A * 6/1998 Shuchart et al. ......... 507/209
5,975,206 A * 11/1999 Woo et al. ................ 166/300
5,981,447 A * 11/1999 Chang et al. ............. 507/271
6,209,646 B1 * 4/2001 Reddy et al. ............. 166/300
6,245,252 B1 * 6/2001 Hicks et al. ............ 252/8.05
6,454,008 B1 * 9/2002 Chatterji et al. ....... 166/308.6
6,488,091 B1 * 12/2002 Weaver et al. ........... 166/300
6,511,944 B2 * 1/2003 Taylor et al. ............. 507/237
6,554,071 B1 * 4/2003 Reddy et al. ............. 166/293

OTHER PUBLICATIONS

"FERROTROL" Fluid Additives Brochure, BJ Services Company, Apr. 26, 2004.*
SPE Paper 36492 by McGowen presented at the 1996 SPE Annual Technical Conference and Exhibition, Denver, Colorado, Oct. 6-9.

* cited by examiner

*Primary Examiner*—George Suchfield
(74) *Attorney, Agent, or Firm*—Robert A. Kent; Baker Botts, L.L.P.

(57) ABSTRACT

The present invention provides improved methods of fracturing subterranean zones penetrated by well bores and improved fracturing fluids. The fracturing fluids are basically comprised of water, a terpolymer of 2-acrylamido-2-methylpropane sulfonic acid, acrylamide and acrylic acid, or its salts, a cross-linking agent for the terpolymer and a delayed viscosity breaker for effecting a controlled reduction in the viscosity of the fracturing fluid.

31 Claims, 5 Drawing Sheets

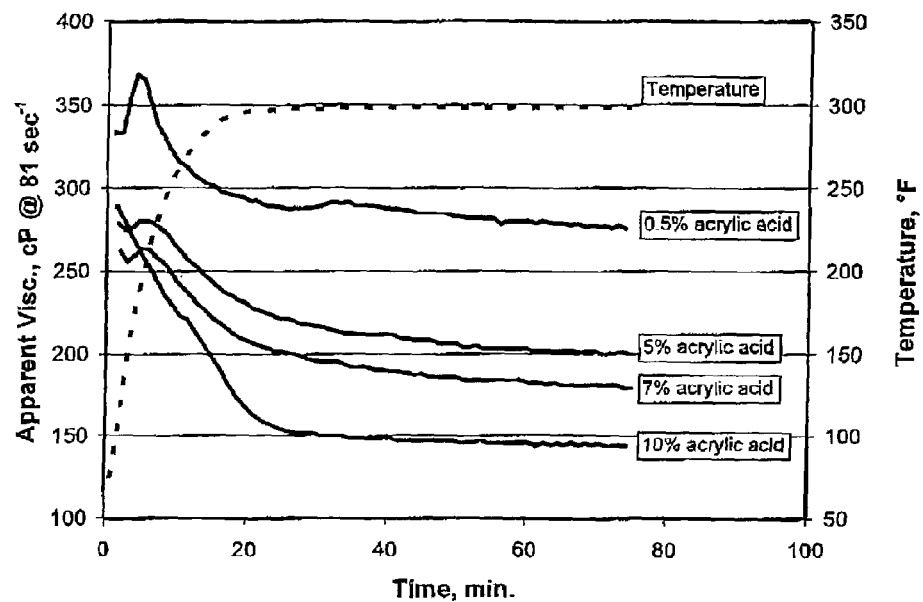
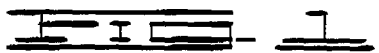
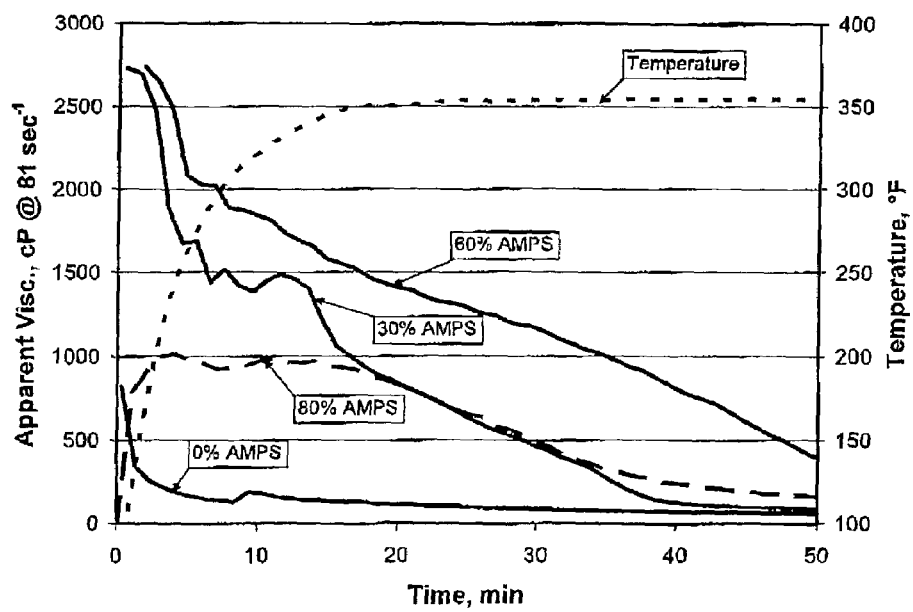
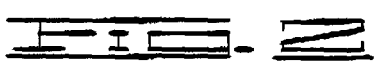

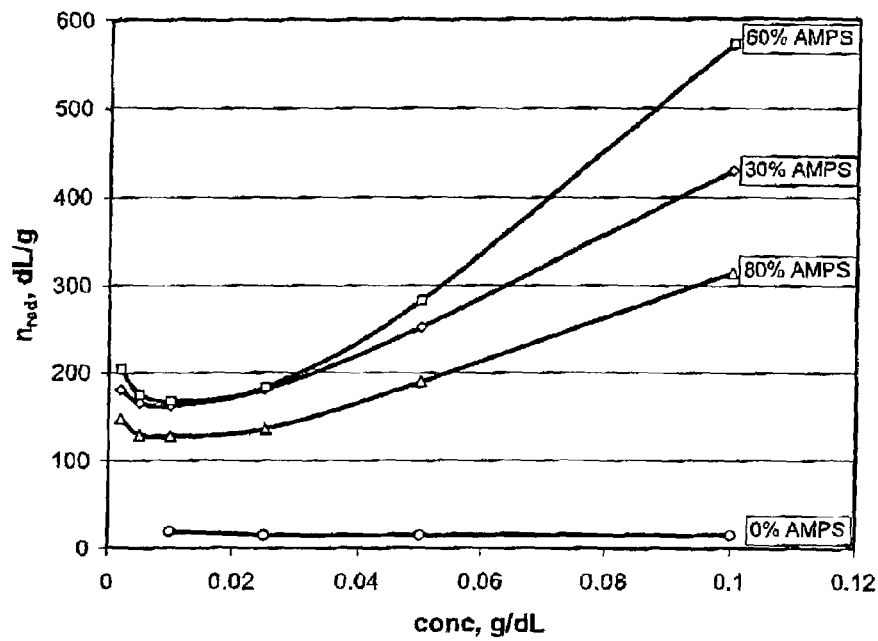
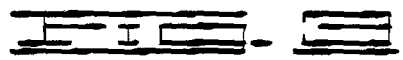
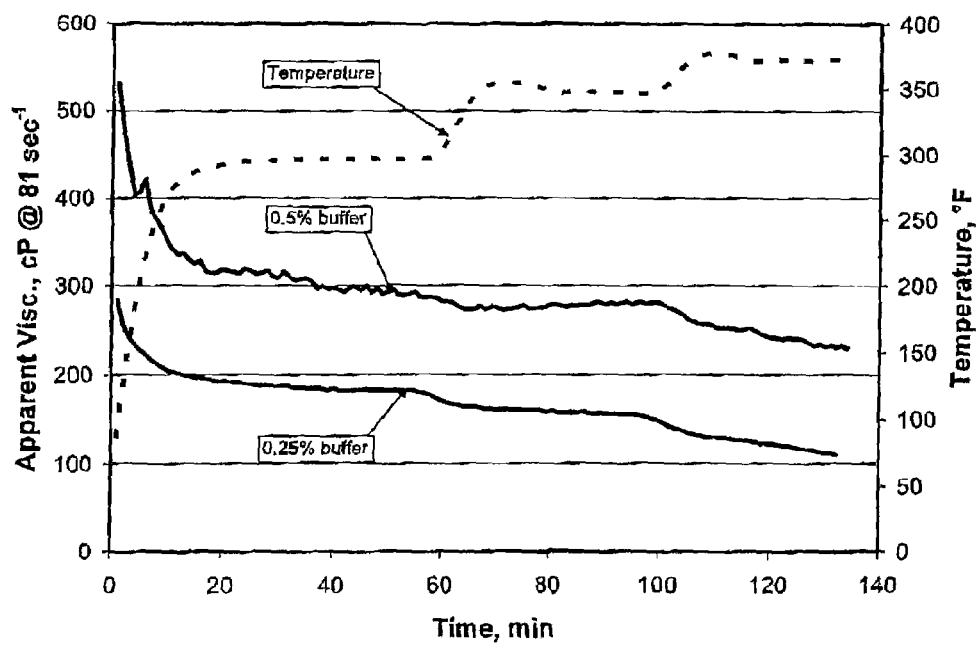
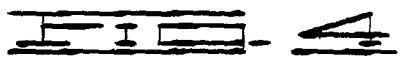

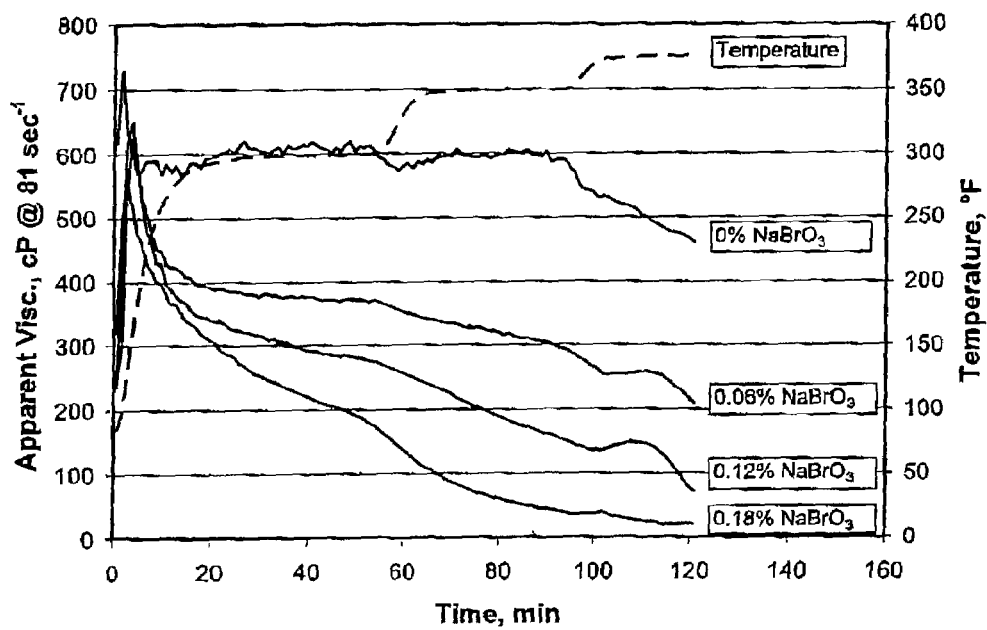
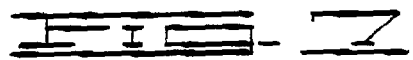
FIG. 7
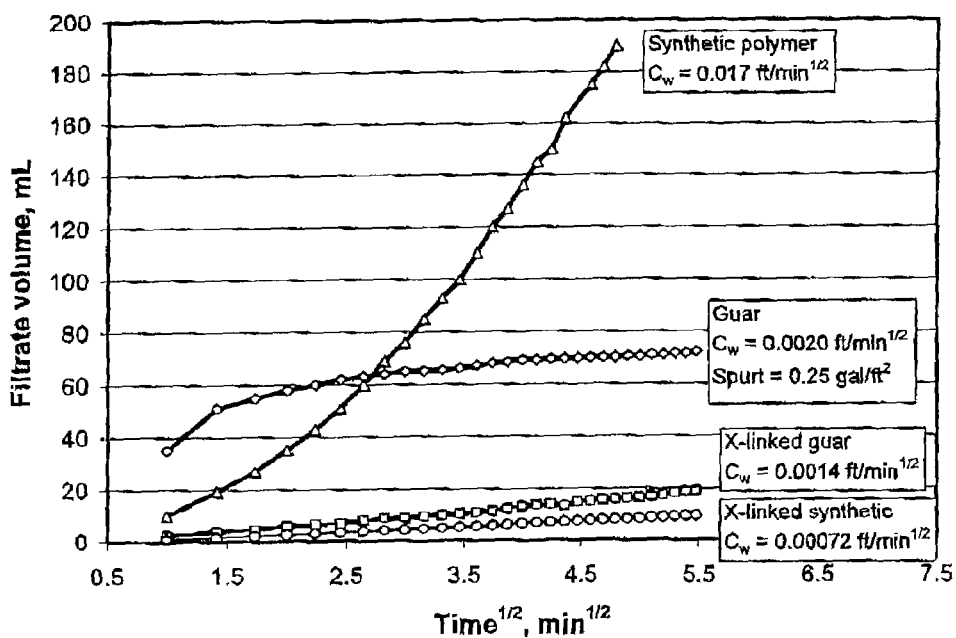
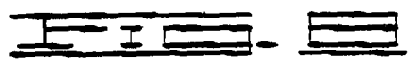
FIG. 8

METHODS OF FRACTURING SUBTERRANEAN ZONES PENETRATED BY WELL BORES AND FRACTURING FLUIDS THEREFOR

BACKGROUND OF THE INVENTION

1. Field of the Invention

The present invention relates to improved methods of fracturing subterranean zones and improved fracturing fluids.

2. Description of the Prior Art

Viscous treating fluids are used in a variety of operations and treatments in hydrocarbon producing wells. One such treatment for stimulating hydrocarbon production from a subterranean zone penetrated by a well bore is hydraulic fracturing. In a hydraulic fracturing treatment, a viscous treating fluid, referred to in the art as a fracturing fluid, is pumped through the well bore into the subterranean zone to be stimulated at a rate and pressure such that fractures are formed and extended in the subterranean zone. At least a portion of the fracturing fluid has proppant material suspended therein which is carried into and deposited in the formed fractures when the viscous fracturing fluid is broken and recovered. The proppant material functions to prevent the formed fractures from closing whereby conductive channels are formed through which produced fluids can flow to the well bore. The breaking of the fracturing fluid, i.e., the reduction in the viscosity of the fracturing fluid whereby it can be recovered is accomplished by adding a delayed breaker to the fracturing fluid prior to pumping it into the subterranean zone. The delayed breaker effects a controlled reduction in the viscosity of the fracturing fluid so that the proppant material therein is deposited in the fractures and the fracturing fluid is recovered.

A variety of aqueous fracturing fluids which utilize natural or synthetic viscosity increasing polymers have been developed and used heretofore. Because of their cost effectiveness, natural polymers formed of guar gum and its derivatives have been the polymers of choice for forming viscous aqueous fracturing fluids. However, in high temperature applications, aqueous fracturing fluids containing guar gum and its derivatives degrade and lose viscosity. As a result, a variety of improvements designed to prevent or reduce the degradation and loss of viscosity of aqueous guar fracturing fluids have heretofore been made. One of the improvements has been to prevent degradation through hydrolysis of the acetal linkages in the backbone of guar polymers by raising the pH of the fracturing fluid. The higher pH reduces the susceptibility of the acetal linkages to hydrolysis. Additionally, gel stabilizers such as methanol and sodium thiosulfate have been added to the aqueous guar fracturing fluids to minimize oxidative degradation. Other techniques include adding chelating agents and/or various free-radical scavengers to the guar fracturing fluids and using precross-linked guar powder to delay hydration and extend the life of the fracturing fluid at elevated temperatures. While these techniques have reduced the degradation of aqueous guar fracturing fluids, they have not eliminated it.

Various viscosity increasing synthetic polymers have been developed for use in aqueous fracturing fluids that can be cross-linked to achieve high viscosity and subsequently broken. While such synthetic polymers have achieved some success, there are continuing needs for improved viscous fracturing fluids which achieve improved performance in fracturing treatments generally and do not suffer from instability at high temperatures.

SUMMARY OF THE INVENTION

The present invention provides improved methods of fracturing subterranean zones penetrated by well bores and improved aqueous fracturing fluids that function better than prior art fracturing fluids generally and do not suffer from a lack of thermal stability. The fracturing fluids of this invention are basically comprised of water, a terpolymer of 2-acrylamido-2-methylpropane sulfonic acid ("AMPS®"), acrylamide and acrylic acid or salts thereof, a cross-linking agent for the terpolymer and a delayed viscosity breaker for effecting a controlled reduction in the viscosity of the fracturing fluid. The methods of this invention are basically comprised of the steps of pumping a fracturing fluid as described above into a subterranean zone by way of a well bore penetrating the zone at a rate and pressure sufficient to fracture the zone and recovering the fracturing fluid from the zone.

The improved methods and fracturing fluids of this invention can be utilized in subterranean zones having temperatures as high as 400° F. without becoming substantially unstable which eliminates the prior art needs of cooling the subterranean formation to be fractured and/or using gel stabilizers. The fracturing fluids of this invention are rapidly cross-linked using known cross-linkers and as a result can be readily mixed on-the-fly. Further, unlike prior viscosity increasing polymers, the polymer of the present invention can tolerate aqueous fluids having high calcium concentration without precipitating.

The objects, features and advantages of the present invention will be readily apparent to those skilled in the art upon a reading of the description of preferred embodiments which follows.

BRIEF DESCRIPTION OF THE DRAWINGS

FIG. 1 is a graph illustrating the effect of the acrylic acid content in the terpolymer of this invention on stability at 300° F.

FIG. 2 is a graph illustrating the effect of the "AMPS®" content in the terpolymer of this invention on viscosity at 350° F.

FIG. 5 is a graph illustrating the effect of sodium thiosulfate on viscosity at 300° F. to 375° F.

FIG. 6 is a graph illustrating the high temperature performance of cross-linked carboxymethylhydroxypropylguar without a breaker over time at 300° F. to 375° F.

FIG. 7 is a graph illustrating the effect of the sodium bromate breaker concentration on break rate at 300° F. to 375° F.

FIG. 8 is a graph illustrating the static fluid test results for the fracturing fluid of this invention (labeled Synthetic Polymer) as compared to a fracturing fluid containing guar before being cross-linked and after being cross-linked.

DESCRIPTION OF PREFERRED EMBODIMENTS

Figure 3:
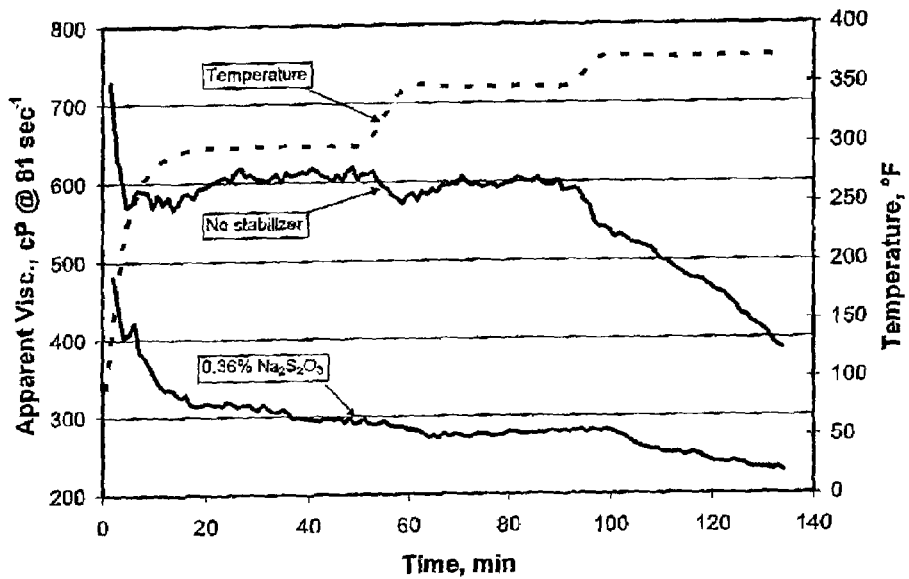
FIG. 3 is a graph illustrating the effect of the "AMPS®" content on reduced viscosity.

As mentioned, the methods of the present invention are basically comprised of the steps of pumping a fracturing fluid of the invention into a subterranean zone by way of a well bore penetrating the zone at a rate and pressure sufficient to fracture the zone and recovering the fracturing fluid from the zone.

The fracturing fluids of the invention are basically comprised of water, a terpolymer of 2-acrylamido-2-methylpropane sulfonic acid (hereinafter also referred to as "AMPS®"), acrylamide and acrylic acid or salts thereof, a cross-linking agent for the terpolymer and a delayed viscosity breaker for effecting a controlled reduction in the viscosity of the fracturing fluid.

The water in the fracturing fluids can be fresh water or salt water. The term "salt water" is used herein to mean unsaturated salt solutions and saturated salt solutions including brine and seawater.

The terpolymer of "AMPS®", acrylamide and acrylic acid hydrates in the presence of water to form a gel that can be rapidly cross-linked by metal ions. The "AMPS®" is present in the terpolymer in an amount in the range of from about 15 weight % to about 80 weight %. The acrylamide is present therein in an amount in the range of from about 20 weight % to about 85 weight % and the acrylic acid or salts thereof are present in an amount in the range of from about 0 weight % to about 10 weight %. More preferably, the terpolymer is formed of 60 weight % of "AMPS®", 39.5 weight % of acrylamide and 0.5 weight % of acrylic acid or salts thereof. The terpolymer is generally present in the fracturing fluid in an amount in the range of from about 0.24% to about 2% by weight of water therein, most preferably in an amount of about 1%. In certain embodiments, for example, terpolymers of the present invention may comprise 2-acrylamido-2-methylpropane sulfonic acid present in an amount of about 55 to about 65 weight %, acrylamide present in an amount of about 34.5 to about 44.5 weight % and acrylic acid, or its salts present in an amount of about 0.1 to about 1 weight %.

As mentioned, the above described terpolymer is very rapidly cross-linked with metal ions which allow the aqueous solution of the terpolymer to be mixed with a metal ion cross-linker on-the-fly. The metal ion is added to the fracturing fluid in the form of a metal ion releasing compound. Examples of the metal ion releasing compounds that can be utilized include, but are not limited to, sources of titanium (IV), zirconium (IV) or hafnium (IV) ions such as for example titanium(IV)(triethanolaminato)isopropoxide, tetrakis(triethanolaminato)zirconium(IV) and hafnium(IV) acetylacetonate. Of these, the most preferred cross-linking metal ion releasing compound is tetrakis(triethanolaminato)zirconium(IV). The metal ion releasing compound utilized is included in the fracturing fluid in an amount in the range of from about 0.02% to about 0.7% by weight of water therein, more preferably in an amount of about 0.5%.

In order to bring about a controlled reduction in the viscosity of the cross-linked fracturing fluid after the fracturing fluid containing proppant material has been placed in the formed fractures, a viscosity breaker is included in the fracturing fluid. While a variety of breakers known to those skilled in the art can be utilized, a preferred breaker for use in accordance with this invention is sodium bromate. When required, the breaker can be encapsulated in a material which slowly releases the breaker in the fracturing fluid. Examples of encapsulating materials that can be used include, but are not limited to, particulate porous materials such as precipitated silica, alumina, zeolites, clays and hydrotalcites. Slowly soluble materials can also be utilized such as EPDM rubber, polyvinylidene chloride (PVDC), nylon, waxes, polyurethanes and cross-linked partially hydrolyzed acrylics. The viscosity breaker is present in said fracturing fluid in an amount in the range of from about 0.01% to about 1.0% by weight of water therein.

In order to achieve and maintain the viscosity of the fracturing fluid at its highest level, a pH buffer can optionally be included in the fracturing fluid. The buffer utilized should maintain the fracturing fluid pH in the range of from about 5 to about 6. While various buffers can be utilized, a particularly suitable buffer is an acetic acid-acetate buffer. When used the buffer is included in the fracturing fluid in an amount in the range of from about 0.1% to about 1.0% by weight of water therein.

A method of the present invention for fracturing a subterranean zone penetrated by a well bore is comprised of the following steps. A viscous aqueous fracturing fluid is pumped into the subterranean zone by way of the well bore at a rate and pressure sufficient to fracture the zone. The aqueous fracturing fluid is comprised of water, a terpolymer of "AMPS®", acrylamide and acrylic acid, a cross-linking agent for the polymer and a delayed viscosity breaker for effecting a controlled reduction in the viscosity of the fracturing fluid. Thereafter, the fracturing fluid is recovered from the subterranean zone.

The components of the fracturing fluid utilized in accordance with the above described method are the same components and are utilized in the same amounts as those described above in connection with the fracturing fluids of this invention.

A particularly suitable method of this invention for fracturing a subterranean zone penetrated by a well bore is comprised of the following steps. A viscous aqueous fracturing fluid is pumped into the subterranean zone by way of the well bore at a rate and pressure sufficient to fracture the zone, the aqueous fracturing fluid being comprised of water, a terpolymer formed of 60 weight % of "AMPS®", 39.5 weight % of acrylamide and 0.5 weight % of acrylic acid or salts thereof present in the fracturing fluid in an amount of about 1% by weight of water therein. A tetrakis(triethanolaminato)zirconium(IV) cross-linking agent is present in the fracturing fluid in an amount of about 0.5% by weight of water therein and a sodium bromate viscosity breaker is present in an amount of about 0.12% by weight of water therein. Thereafter, the fracturing fluid is recovered from the subterranean zone.

The fracturing fluid utilized in the above described method preferably also includes an acetic acid-acetate buffer for maintaining the pH of the fracturing fluid at about 6. When used, the acetic acid-acetate buffer is present in the fracturing fluid in an amount of about 0.5% by weight of water therein.

A preferred method of fracturing a subterranean zone penetrated by a well bore comprises the steps of: (a) pumping a viscous aqueous fracturing fluid into the subterranean zone by way of the well bore at a rate and pressure sufficient to fracture the zone, the aqueous fracturing fluid being comprised of water, a terpolymer of "AMPS®", acrylamide and acrylic acid, a cross-linking agent for the polymer and a delayed viscosity breaker for effecting a controlled reduction in the viscosity of the fracturing fluid; and (b) recovering the fracturing fluid from the subterranean zone.

Another preferred method of fracturing a subterranean zone penetrated by a well bore is comprised of the steps of: (a) pumping a viscous aqueous fracturing fluid into the subterranean zone by way of the well bore at a rate and pressure sufficient to fracture the zone, the aqueous fracturing fluid being comprised of water, a terpolymer formed of 60 weight % "AMPS®", 39.5 weight % of acrylamide and 0.5 weight % of acrylic acid or salts thereof present in the fracturing fluid in an amount of about 1% by weight of water therein; a tetrakis(triethanolaminato)zirconium(IV) cross-linking agent present in the fracturing fluid in an amount of about 0.5% by weight of water therein and a sodium bromate viscosity breaker present in an amount of about 0.24% by weight of water therein; and (b) recovering the fracturing fluid from the subterranean zone.

A preferred viscous aqueous fracturing fluid for fracturing a subterranean zone penetrated by a well bore comprises: water; a terpolymer of "AMPS®", acrylamide and acrylic acid or salts thereof; a cross-linking agent for the terpolymer; and a delayed viscosity breaker for effecting a controlled reduction in the viscosity of the fracturing fluid.

A more preferred viscous aqueous fracturing fluid for fracturing a subterranean zone penetrated by a well bore comprises: water; a terpolymer formed of 60 weight % "AMPS®", 39.5 weight % of acrylamide and 0.5 weight % of acrylic acid or salt thereof present in the fracturing fluid in an amount of about 1% by weight of water therein; a tetrakis(triethanolaminato)zirconium(IV) cross-linking agent present in the fracturing fluid in an amount of about 0.5% by weight of water therein; and a sodium bromate viscosity breaker present in an amount of about 0.24% by weight of water therein.

In order to further illustrate the methods and fracturing fluids of the present invention, the following examples are given.

EXAMPLE 1

In order to verify the thermal stability of the polymer of this invention, fluid viscosities were measured with a Fann model 50 viscometer equipped with a B5 extended bob at a shear rate of 81 sec$^{-1}$. Four polymer compositions were tested, the first comprised of 60 weight % "AMPS®"; 0.5 weight % acrylic acid and 39.5 weight % acrylamide. The second, third and fourth polymer compositions all contained 60 weight % "AMPS®", 5 weight %, 7 weight % and 10 weight % acrylic acid, respectively, with the remainder being acrylamide. The four terpolymers were each combined with water in amounts of 0.8% by weight along with 0.4% by volume of a zirconium-triethanolamine complex cross-linker. The results of the tests are shown in FIG. 1.

No appreciable viscosity degradation was indicated for any of the polymers and they all showed similar stability. However, the overall viscosity increased with decreasing acrylate content.

EXAMPLE 2

In order to determine the role of "AMPS®" concentration in the polymer performance, a series of polymers were synthesized with varying "AMPS®" content. The acrylate content was held constant at 0.5 weight % with the remainder being acrylamide. 1% by volume solutions in water containing 2% potassium chloride were prepared, buffered with 0.5% acetate-acetic acid buffer and cross-linked with 0.8% by volume of zirconium-triethanolamine complex cross-linker. The viscosities of the solutions were monitored at 350° F. using the model 50 viscometer over time. As shown in FIG. 2, the viscosity increased with increasing "AMPS®" content up to 60 weight %, but a further increase to 80 weight % resulted in a reduction of viscosity. Reduced viscosity also showed an increase with increasing "AMPS®" concentration up to 60 weight % followed by a substantial decrease at 80 weight % "AMPS®" as shown in FIG. 3. For these polyelectrolytes with equivalent degrees of polymerization, reduced viscosity is expected to increase with increasing charged density in the absence of added electrolytes due to expansion of the polymer molecule from electrostatic effects. The decrease in reduced viscosity with 80 weight % "AMPS®" implies the degree of polymerization is suppressed when high proportions of "AMPS®" are used. Rather than becoming linear at low concentrations, the "AMPS®" terpolymers all showed an increase in reduced viscosity. This is typical behavior for polyelectrolytes in pure water and is due to an expansion of the polymer caused by further disassociation of counter ions and an increase in net charge on the polymer backbone with dilution.

EXAMPLE 3

The terpolymer selected for further development was comprised of 60 weight % "AMPS®", 39.5 weight % acrylamide and 0.5 weight % acrylic acid, neutralized with sodium hydroxide. A 1% by weight solution of the polymer in water containing 2% potassium chloride was prepared containing 0.36% by weight sodium thiosulfate, 0.25% by volume acetic acid-acetate buffer and 0.8% by volume of zirconium-triethanolamine complex cross-linker. The resulting gelled solution was monitored at 300° F., increased to 350° F. and finally increased to 375° F. The results of these tests are shown in FIG. 4.

Figure 4:
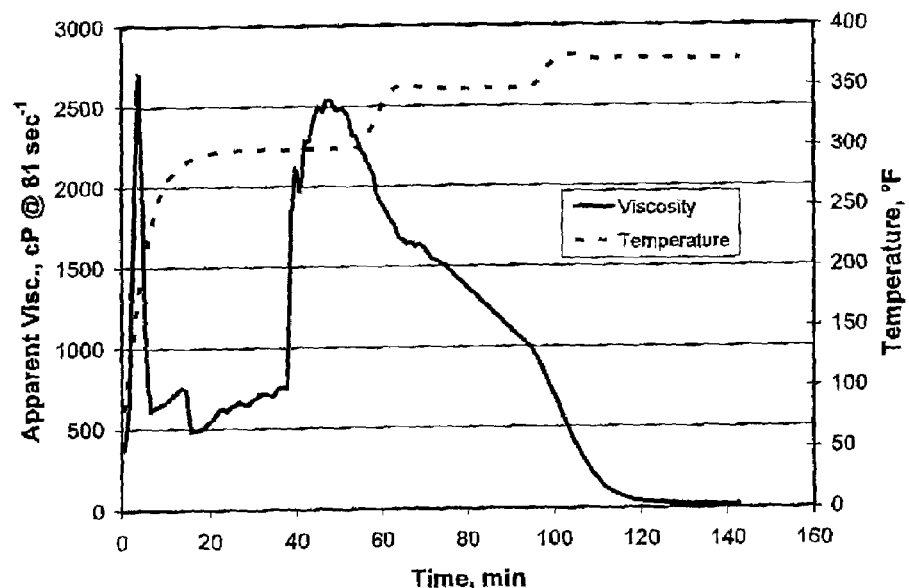
FIG. 4 is a graph illustrating the effect of buffer concentration on viscosity at 300° F. to 375° F.

The viscosity as shown in FIG. 4 was not as high as expected from the previous tests. The pH of the fluid after removing it from the viscometer had increased to 7.7 which was well above the optimum pH observed. As a result, the buffer concentration was doubled to 0.5% by volume which brought about a substantial improvement in viscosity as shown in FIG. 4. The pH rise was suppressed as a result of the higher buffer concentration which resulted in a final pH of 6.6.

EXAMPLE 4

Sodium thiosulfate was included to improve the stability of the fluid at 375° F. In order to determine the magnitude of the stabilizing effect of sodium thiosulfate, a control was run without sodium thiosulfate as shown in FIG. 5. Surprisingly, the viscosity of the fluid without sodium thiosulfate was substantially higher throughout the test. The water utilized in the tests with and without sodium thiosulfate was a solution of 2% potassium chloride making it unlikely that the difference in performance was simply due to differences in electrolyte concentration. In order to contrast the stability of the polymer of this invention with a polysaccharide, a 1% carboxymethylhydroxypropyl guar cross-linked with zirconium and stabilized with 0.36% sodium thiosulfate was tested under the same conditions. The results of the tests are given in FIG. 6. Even though no breaker was present in the test sample, rapid viscosity loss was apparent as the fluid reached 350° F. As shown in FIG. 6, the fluid was completely broken by the time it reached 375° F. even though no breaker was utilized.

EXAMPLE 5

The stability of the polymer fluid of the present invention made it necessary to find an effective breaker for the fluid. Initial screening was done with static tests at 300° F. and 500 psi for 4 hours using 1% by weight terpolymer cross-linked with zirconium-triethanolamine complex. Three breakers were investigated, i.e., sodium bromate, sodium chlorite and sodium persulfate. The results of the tests are given in Table I below.

TABLE I

Static Gel Break Test Results

| Breaker Type | Concentration, % | Final Visc., cP @ 511 sec$^{-1}$ |
|---|---|---|
| Sodium chlorite | 0.24 | >300 |
| Sodium chlorite | 0.36 | >300 |
| Sodium bromate | 0.18 | 70 |
| Sodium bromate | 0.36 | 37 |
| Sodium persulfate | 0.06 | 43 |
| Sodium persulfate | 0.18 | 11 |

After removing the samples from the autoclave utilized in the static tests, the gels with sodium bromate and sodium persulfate were effectively broken although sodium bromate required a higher concentration than sodium persulfate. In contrast, sodium chlorite was completely ineffective. Sodium persulfate was found to be too aggressive to be useful, but sodium bromate provided a controllable break rate as shown in FIG. 7.

EXAMPLE 6

Fluid loss testing revealed interesting differences between the terpolymer of the present invention and guar gum. Static fluid loss tests were conducted at ambient temperature as shown in FIG. 8. A solution of 1% by weight of the terpolymer of the present invention was compared to a 0.66% by weight solution of guar gum which had the same viscosity at 511 sec$^{-1}$. In the uncross-linked state, the guar had a spurt loss of 0.25 gallon/ft$^2$ and a $C_w$ of 0.002 ft. per minute$^{1/2}$. In contrast, the uncross-linked synthetic polymer showed no tendency to form a filter cake and had a $C_w$ nearly 10 times higher than the guar. This clearly demonstrates the cleanliness of the synthetic polymer. The test was repeated after cross-linking which showed superior fluid loss control for the terpolymer of the present invention with a $C_w$ approximately half that of the cross-linked guar.

EXAMPLE 7

Dramatic differences were also observed in dynamic fluid loss tests conducted at 250° F. In accordance with the dynamic fluid loss tests, fluid loss was measured under dynamic conditions using the apparatus and method described by McGowen in SPE Paper 36492 presented at the 1996 SPE Annual Technical Conference and Exhibition, Denver, Colo., 6–9 October. The fluid was prepared by dissolving 1% by weight of the polymer utilized and 0.5% by volume acetate buffer in an aqueous solution of 2% potassium chloride. Zirconium-triethanolamine complex cross-linker was added on-the-fly at a rate of 8 gallons per thousand gallons while pumping at a flow rate of 310 milliliters per minute. The fluid was subjected to high shear (453 sec$^{-1}$) through 140 ft. of ¼' tubing and then heated to 250° F. at a reduced shear rate of 50 sec$^{-1}$ through 180 ft. of ½' tubing. Upon exiting the heating loop, the test fluid entered the dynamic fluid loss cell having a slot width of 0.16' and a shear rate of 50 sec$^{-1}$. The rock types used were high permeability Berea sandstone (250–500 md), low permeability Berea sandstone (25–50 md) and Ohio sandstone (0.5–1 md). The differential pressure was held at a constant 1,000 psi for the duration of the test. For comparison, the test was repeated with a typical zirconium cross-linked 0.6% by weight carboxymethylhydroxypropyl guar fluid.

Figure 9:
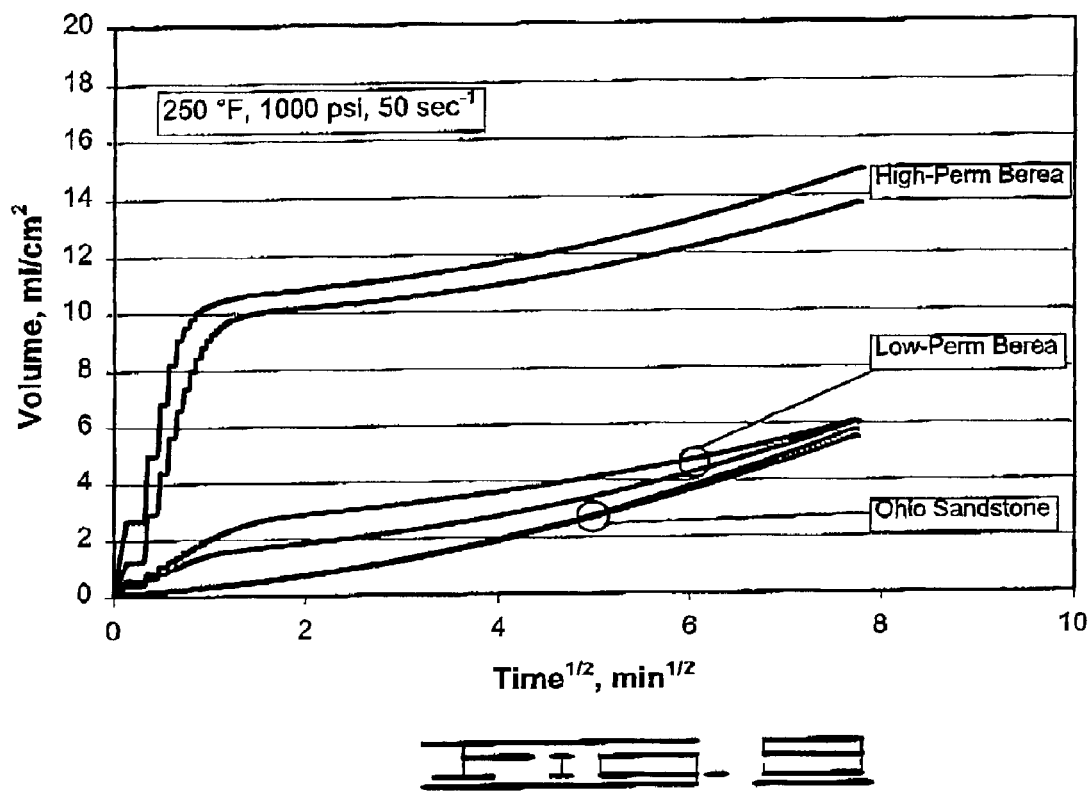
FIG. 9 is a graph illustrating the dynamic fluid loss of a zirconium cross-linked carboxymethylhydroxypropylguar fracturing fluid.
Figure 10:
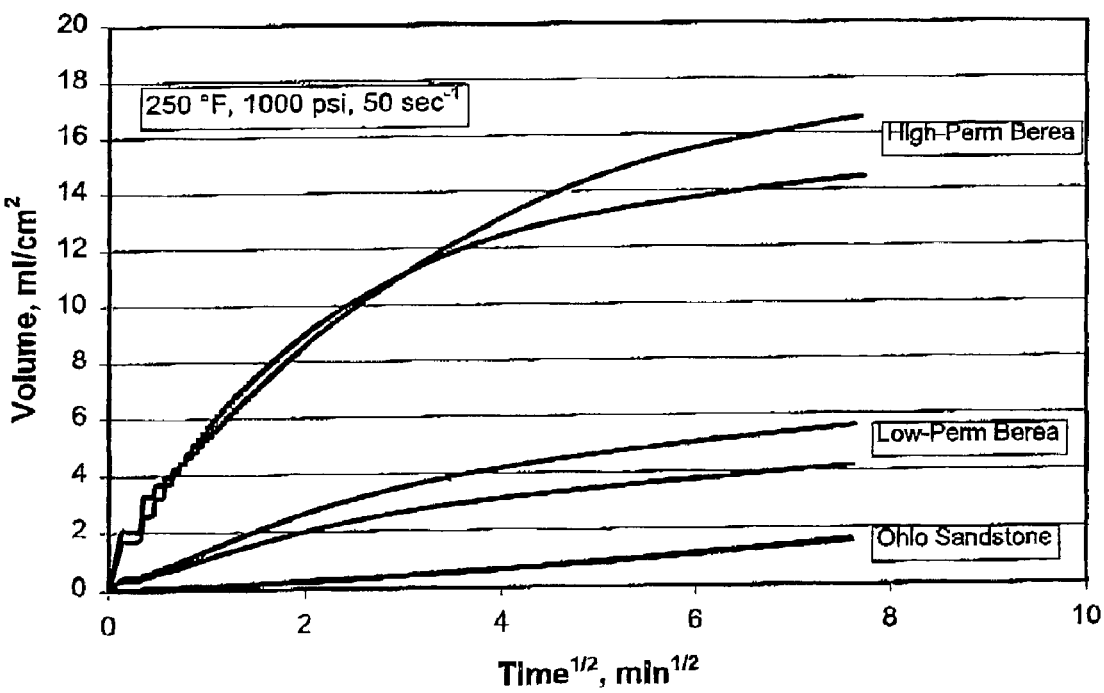
FIG. 10 is a graph illustrating the dynamic fluid loss of the zirconium cross-linked fracturing fluid of the present invention.

The performance of the typical zirconium cross-linked 0.6% by weight carboxymethylhydroxypropyl guar is as shown in FIG. 9. Rapid formation of a filter cake is evident, followed by an upward curvature of the plot as the test progressed. This upward curvature is indicative of erosion of the filter cake under the dynamic conditions of the test. In contrast, the synthetic polymer fluid showed a steadily increasing filter cake development with no erosion under dynamic conditions except for a small effect on the lowest permeability cores as shown in FIG. 10. The fluid containing the terpolymer of this invention appears to control fluid loss on the lower permeability cores better than the carboxymethylhydroxypropyl guar fluid. $C_w$ and Spurt for both fluids on the various cores are shown in Table II.

TABLE II

Dynamic Fluid Loss Results

| Core | Synthetic Polymer Fluid | | CMHPG Fluid | |
|---|---|---|---|---|
| | $C_w$, ft/min$^{1/2}$ | Spurt, gal/ft$^2$ | $C_w$, ft/min$^{1/2}$ | Spurt, gal/ft$^2$ |
| High perm Berea | 0.0195 | 1.78 | 0.00089 | 2.49 |
| Low perm Berea | 0.0067 | 0.465 | 0.00036 | 0.43 |
| Ohio sandstone | 0.0034 | 0 | 0.0030 | 0.019 |

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of fracturing a subterranean zone comprising:
   pumping a viscous aqueous fracturing fluid into said subterranean zone by way of a well bore at a rate and pressure sufficient to fracture said zone, said aqueous fracturing fluid comprising water, a terpolymer of 2-acrylamido-2-methylpropane sulfonic acid present in an amount of about 55 to about 65 weight %, acrylamide present in an amount of about 34.5 to about 44.5 weight % and acrylic acid, or its salts present in an amount of about 0.1 to about 1 weight %, a cross-linking agent for said terpolymer and a delayed viscosity breaker for effecting a controlled reduction in the viscosity of said fracturing fluid; and
   creating a fracture in said formation.

2. The method of claim 1 defined further to include admixing a proppant with at least a portion of said fracturing fluid introduced into said subterranean zone and depositing said proppant in at least a portion of said created fracture.

3. The method of claim 1 wherein said cross-linking agent is selected from the group consisting of titanium(IV)(triethanolaminato)isopropoxide, tetrakis(triethanolaminato) zirconium(IV) and hafnium(IV)acetylacetonate.

4. The method of claim 3 wherein said cross-linking agent is tetrakis(triethanolaminato)zirconium(IV).

5. The method of claim 1 wherein said cross-linking agent is present in said fracturing fluid in an amount in the range of from about 0.02% to about 0.7% by weight of water therein.

6. The method of claim 1 wherein said delayed viscosity breaker is sodium bromate.

7. The method of claim 1 wherein said cross-linking agent is a source of titanium (IV), zirconium (IV) or hafnium (IV) ions.

8. The method of claim 1 wherein said delayed viscosity breaker is present in said fracturing fluid in an amount in the range of from about 0.01% to about 1.0% by weight of water therein.

9. The method of claim 1 wherein said fracturing fluid further comprises a buffer for maintaining the pH of said fracturing fluid in the range of from about 5 to about 6.

10. The method of claim 9 wherein said buffer is an acetic acid-acetate buffer.

11. The method of claim 9 wherein said buffer is present in said fracturing fluid in an amount in the range of from about 0.1% to about 1.0% by weight therein.

12. The method of claim 1 wherein said water is selected from the group consisting of fresh water and salt water.

13. The method of claim 1 wherein said terpolymer of 2-acrylamido-2-methylpropane sulfonic acid, acrylamide and acrylic acid is present in said fracturing fluid in an amount in the range of from about 0.24% to about 2% by weight of water therein.

14. A method of fracturing a subterranean zone comprising:
pumping a viscous aqueous fracturing fluid into said subterranean zone by way of a well bore at a rate and pressure sufficient to fracture said zone, said aqueous fracturing fluid being comprised of water, a terpolymer formed of from about 15 to about 80 weight % of 2-acrylamido-2-methylpropane sulfonic acid, from about 20 to about 85 weight % of acrylamide and up to about 10 weight % of acrylic acid or its salts present in said fracturing fluid in an amount of from about 0.24 to about 2% by weight of water therein; a tetrakis(triethanolaminato)zirconium(IV) cross-linking agent present in said fracturing fluid in an amount of about 0.02 to about 0.7% by weight of water therein and a delayed viscosity breaker comprising sodium bromate present in an amount of from about 0.01 to about 1% by weight of water therein wherein said delayed viscosity breaker is encapsulated in a material which slowly releases said delayed viscosity breaker in said aqueous fracturing fluid; and
creating a fracture in said formation.

15. The method of claim 14 wherein said fracturing fluid further comprises an acetic acid-acetate buffer present in an amount sufficient to maintain the pH of said fracturing fluid in the range of from about 5 to about 6 during pumping.

16. The method of claim 14 defined further to include admixing a proppant with at least a portion of said fracturing fluid introduced into said subterranean zone and depositing said proppant in at least a portion of said created fracture.

17. A fluid composition comprising:
water;
a terpolymer of 2-acrylamido-2-methylpropane sulfonic acid, acrylamide and acrylic acid or its salts for viscosifying said fluid;
a cross-linking agent for said terpolymer; and
a delayed viscosity breaker for effecting a controlled reduction in the viscosity of said fluid.

18. The composition of claim 17 wherein said 2-acrylamido-2-methylpropane sulfonic acid or its salts is present in said terpolymer in an amount in the range of from about 15 weight % to about 80 weight %, said acrylamide is present in an amount in the range of from about 20 weight % to about 85 weight % and said acrylic acid or its salts is present in an amount in the range of from about 0 weight % to about 10 weight %.

19. The composition of claim 17 wherein said 2-acrylamido-2-methylpropane sulfonic acid or its salts is present in said terpolymer in an amount of about 55 to about 65 weight %, said acrylamide is present in an amount of about 34.5 to about 44.5 weight % and said acrylic acid or its salts is present in an amount of about 0.1 to about 1 weight %.

20. The composition of claim 17 wherein said terpolymer is present in said fluid composition in an amount in the range of from about 0.24% to about 2% by weight of water therein.

21. The composition of claim 17 wherein said cross-linking agent is selected from the group consisting of titanium(IV)(triethanolaminato)isopropoxide, tetrakis(triethanolaminato)zirconium(IV) and hafnium(IV)acetylacetonate.

22. The composition of claim 17 wherein said cross-linking agent is tetrakis(triethanolaminato)zirconium(IV).

23. The composition of claim 17 wherein said cross-linking agent is present in said fluid composition in an amount in the range of from about 0.02% to about 0.7% by weight of water therein.

24. The composition of claim 17 wherein said delayed viscosity breaker is sodium bromate.

25. The composition of claim 17 wherein said delayed viscosity breaker is present in said fluid composition in an amount in the range of from about 0.1% to about 1.0% by weight of water therein.

26. The composition of claim 17 wherein said fluid composition further comprises a buffer for maintaining the pH of said fluid composition in the range of from about 5 to about 6.

27. The composition of claim 26 wherein said buffer is an acetic acid-acetate buffer.

28. The composition of claim 27 wherein said buffer is present in said fluid composition in an amount in the range of from about 0.1% to about 1.0% by eight of water therein.

29. The composition of claim 17 wherein said water is selected from the group consisting of fresh water and salt water.

30. The composition of claim 17 wherein the delayed viscosity breaker is encapsulated in a material which slowly releases the delayed viscosity breaker in the fracturing fluid.

31. The composition of claim 30 wherein the material encapsulating the delayed viscosity breaker is precipitated silica, alumina, a zeolite, a clay, or a hydrotalcite.

* * * * *